No. 763,480. Patented June 28, 1904.

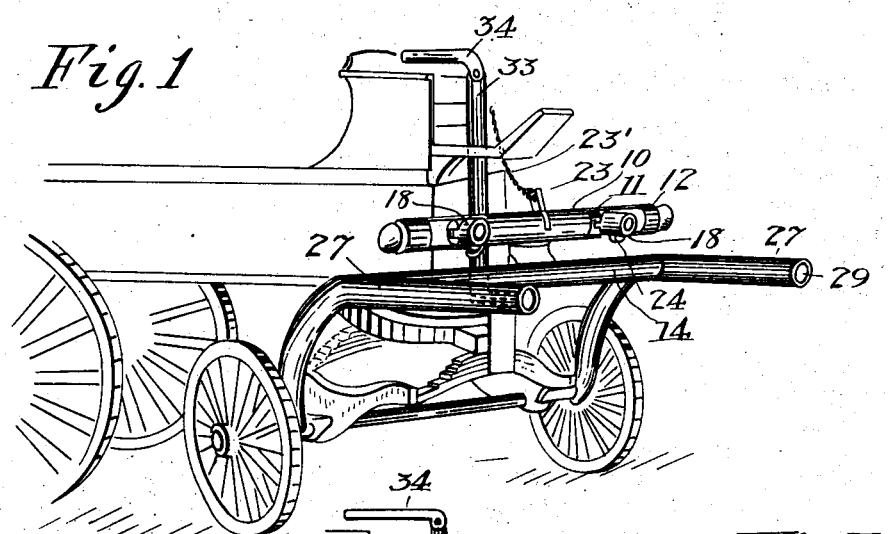

UNITED STATES PATENT OFFICE.

FREDERICK CHARLES GOETTERT, OF SEATTLE, WASHINGTON.

SAFETY HORSE-RELEASE FOR VEHICLES.

SPECIFICATION forming part of Letters Patent No. 763,480, dated June 28, 1904.

Application filed September 5, 1902. Serial No. 122,257. (No model.)

*To all whom it may concern:*

Be it known that I, FREDERICK CHARLES GOETTERT, a subject of the Emperor of Germany, (but having declared my intention of becoming a citizen of the United States,) and a resident of the city of Seattle, in the county of King and State of Washington, have invented certain new and useful Improvements in Safety-Releases, of which the following is a specification.

My invention relates to improvements in means for releasing horses from vehicles, and has special reference to a safety device of this class which shall act to instantly disconnect unruly horses.

Among numerous objects attained by this invention and readily understood from the following specification and accompanying drawings, included as a part thereof, is the production of a simple and efficient safety-release for horses which is positive in action and embodies essential features of adaptability, utility, and durability.

The above-mentioned and numerous other objects equally as desirable are attained by the construction, combination, and arrangement of parts as disclosed on the drawings, set forth in this specification, and succinctly pointed out in the appended claims.

With reference to the drawings filed herewith and bearing like reference characters for corresponding parts throughout, Figure 1 is a perspective view of a portion of an ordinary wagon equipped with my improved safety-release, which is indicated in relative position and condition after the horse has been released. Fig. 2 is a plan view of a swingletree embodying features of my invention shown in normal position and indicated with portions broken away to better disclose the construction. Fig. 3 is a view in side elevation of the shafts of a wagon embodying features of the invention and indicates the swingletree in transverse section. Fig. 4 is a plan view of one end of the swingletree indicated in longitudinal section and adjusted to allow the tug to be released. Fig. 5 is a transverse section of the swingletree on line 5 5 of Fig. 2, viewed as the arrows indicate, and shown with the parts in normal position and on large scale. Fig. 6 is a vertical section of a portion of the front end of a wagon, disclosing the steering device preferably employed on the vehicle; and Fig. 7 is a plan view of said device detached.

This invention comprehends operable means whereby the tugs of a harness are detachably connected to a vehicle for instant release from the seat and as now considered includes a swingletree, as 10, comprising a horizontally-disposed rotatable bar 11, operably seated in a suitable casing 12, which is conveniently pivoted to the base of the shafts of a vehicle, as 14, by a suitable vertically-disposed bolt, as 15, seated in said base, and in a laterally-projecting lug 16, attached to said casing. Suitable means, as pivotally-mounted studs 18, are arranged on this bar 11 for the connection of the tugs of the harness, so that they will be securely attached when the bar is in normal position, but can be freed for instant release by a predetermined part of a rotation of said bar. In the present embodiment these studs 18 are each formed with a peripheral channel 19 at the outer end to receive the tug and have an ear 20 on the inner end, which fits in a suitable slot formed in the end of bar 11, and a pivot 21 is disposed transversely the walls of said slot at right angles to the axis of the bar, whereby when the bar is turned to bring said pivot to a horizontal position, Fig. 2, the stud will be held against action of the tug, but when the bar is turned to bring said pivot to a vertical position the stud is free to swing forwardly on said pivot and allow the tug to slip therefrom, and thereby release same. This bar is conveniently operated by means of a laterally-projecting arm 23, fixed thereto substantially midway its length, and to the outer end of this arm a suitable draft-line 23' is attached and leads to the position of the driver, so that the bar may be operated from the seat by pulling on this line. This casing 12 preferably consists of a tubular section of suitable length to receive the bar 11 and the studs 18 and is formed with suitable end walls arranged in close proximity to the outer ends of these studs to conveniently prevent the tugs from being accidentally detached when the studs are closed in normal position. Suitable slots are arranged in the wall of this casing to permit of free action of the studs 18 and arm 23, and as now considered a suitable keeper, as a laterally-projecting hook 24, is fastened to each of the studs and arranged to embrace the casing when the bar is in normal position, Fig. 5. As now considered, each shaft, as 26, comprises a stub-section 27 and a forward section 28, suitably removably connected thereto, so as to separate from the stub in case of outward pull on the forward section. In the present instance this connection is made by forming a socket 29 in the outer end of each stub-section and a stem 30 of suitable size on the inner end of the forward section to snugly but slidably fit in this socket. In the present embodiment a rearwardly-projecting spring 31, consisting of a bar of resilient metal, is attached by one end to the forward section of each shaft at the base of stem 30 and suitably bent to press upon the stub-section, and thereby render the connection of the shaft parts more rigid, and a suitable laterally-projecting loop 32 is attached to the forward section adjacent the rear end to receive the backing-strap of the harness.

A suitable steering device is preferably associated with the wagon, by which it can be guided after the horse is released, and as now considered this device consists of a vertically-disposed post 33, rotatably mounted at the forward end of the wagon and having a handle 34, pivotally mounted on the upper end, and a laterally-projecting arm 35, fixed to the lower end, having an elongated slot 36, adapted to engage a vertically-disposed pivot 37, fixed to the truck member of the fifth-wheel of the wagon at the periphery thereof.

The horse is hitched to the vehicle thus arranged by the ordinary harness, though suitable rings, as 38, may be attached to the tugs, if desired, for a more perfect connection with the studs 18, and the backing-straps should be secured to the forward sections of the shafts. If the horse becomes unmanageable, the driver simply draws upon line 23', which rotates bar 11, and the studs are thus brought into proper position for the draft on the tugs to swing them outwardly on their pivots, when the tugs will slip from the ends thereof and the forward sections of the shafts will be carried away with the horse.

Having thus described my invention, what I claim as new, and desire to secure by Letters Patent of the United States of America, is—

1. In a safety-release; a swingletree comprising a rotatably-mounted bar, and tug-seats pivotally connected with said bar at right angles to its axis of rotation.

2. In a safety-release; a swingletree comprising a rotatably-mounted bar having a transversely-disposed slot in each end, a tug-seat at each end of said bar comprising a stud having a tongue fitting in said slot and pivotally connected with said bar at right angles to the axis of rotation.

3. In a safety-release; a tubular casing, a bar rotatably mounted in the casing, a tug-seat at each end of the bar comprising a stud pivotally connected therewith to swing laterally, and means to operate the bar.

4. In a safety-release; a casing, a bar rotatably mounted in the casing, a tug-seat at each end of the bar comprising a stud, pivots disposed at right angles to the axis of the bar and connecting the studs thereto, a laterally-disposed arm secured to said bar, and a draft-line attached to said arm.

5. In a safety-release; a casing, a bar rotatably mounted in the casing, a tug-seat at each end of the bar comprising a stud, pivots disposed at right angles to the axis of the bar and connecting the studs thereto, a laterally-disposed arm secured to said bar, and a hook secured to each stud and normally engaging said casing.

Signed at Seattle, Washington, this 31st day of July, 1902.

FREDERICK CHARLES GOETTERT.

Witnesses:
JOHN L. CAMERON,
E. R. SPIRTAS.